US008884932B2

(12) United States Patent
Fukushima et al.

(10) Patent No.: US 8,884,932 B2
(45) Date of Patent: Nov. 11, 2014

(54) PEN TYPE COORDINATE INDICATOR

(71) Applicant: Wacom Co., Ltd., Saitama (JP)

(72) Inventors: Yasuyuki Fukushima, Saitama (JP); Hiroyuki Fujitsuka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 129 days.

(21) Appl. No.: 13/794,171

(22) Filed: Mar. 11, 2013

(65) Prior Publication Data

US 2013/0241897 A1    Sep. 19, 2013

(30) Foreign Application Priority Data

Mar. 15, 2012  (JP) ................................ 2012-058712

(51) Int. Cl.
*G06F 3/0354*    (2013.01)
*G06F 3/046*    (2006.01)
(52) U.S. Cl.
CPC ............ *G06F 3/03545* (2013.01); *G06F 3/046* (2013.01)
USPC ....................................... 345/179; 178/19.04
(58) Field of Classification Search
USPC ................ 382/188; 178/18.01, 18.03, 19.01, 178/19.02, 19.03, 19.04, 19.05, 20.1; 345/173, 178, 179
See application file for complete search history.

(56) References Cited

U.S. PATENT DOCUMENTS 5,206,785 A    4/1993 Hukashima
5,461,204 A    10/1995 Makinwa et al.
6,937,231 B2 *    8/2005 Fujitsuka et al. ............. 345/179
6,999,067 B2 *    2/2006 Chao et al. .................... 345/179
2003/0122795 A1    7/2003 Fujitsuka et al.

FOREIGN PATENT DOCUMENTS

EP        0 727 756 A1    8/1996
JP         04096212 A      3/1992
JP        2002244806 A     8/2002

OTHER PUBLICATIONS

Extended European Search Report, dated Nov. 7, 2013, for corresponding European Application No. 13157915.3-1960 / 2639682, 4 pages.

* cited by examiner

*Primary Examiner* — Abbas Abdulselam
(74) *Attorney, Agent, or Firm* — Seed IP Law Group PLLC (57) ABSTRACT

A pen type coordinate indicator for a position input device is provided, which is capable of widening a detection range of a pressing pressure (pen pressure) while preventing erroneous (false) detection. A coil spring (i.e., a first elastic body) and a silicon rubber (i.e., a second elastic body) are interposed between an end surface of a first ferrite core, around which a coil connected to a resonance circuit is wound, and an end surface of a second ferrite core, within the pen. The first and second elastic bodies operate to controllably change (narrow) the distance between the two end faces in accordance with the pressure applied to the pen tip. As a result, an inductance value of the coil wound around the first ferrite core is controllably changed and thus a phase (frequency) of an electric wave transmitted from the resonance circuit to a position detector is controllably changed.

20 Claims, 10 Drawing Sheets

ANOTHER CONFIGURATION OF PEN TYPE COORDINATE INDICATOR

PEN TYPE COORDINATE INDICATOR

CROSS-REFERENCE TO RELATED APPLICATION(S)

The present application claims priority under 35 U.S.C. 119(a) of Japanese Application No. 2012-058712, filed Mar. 15, 2012, the entire content of which is incorporated herein by reference.

BACKGROUND

1. Technical Field

The present invention relates to a pen type coordinate indicator, which indicates a position to be detected to a position detector for detecting an indicated position, and which supplies information corresponding to a user operation.

2. Description of the Related Art

Figure 10:
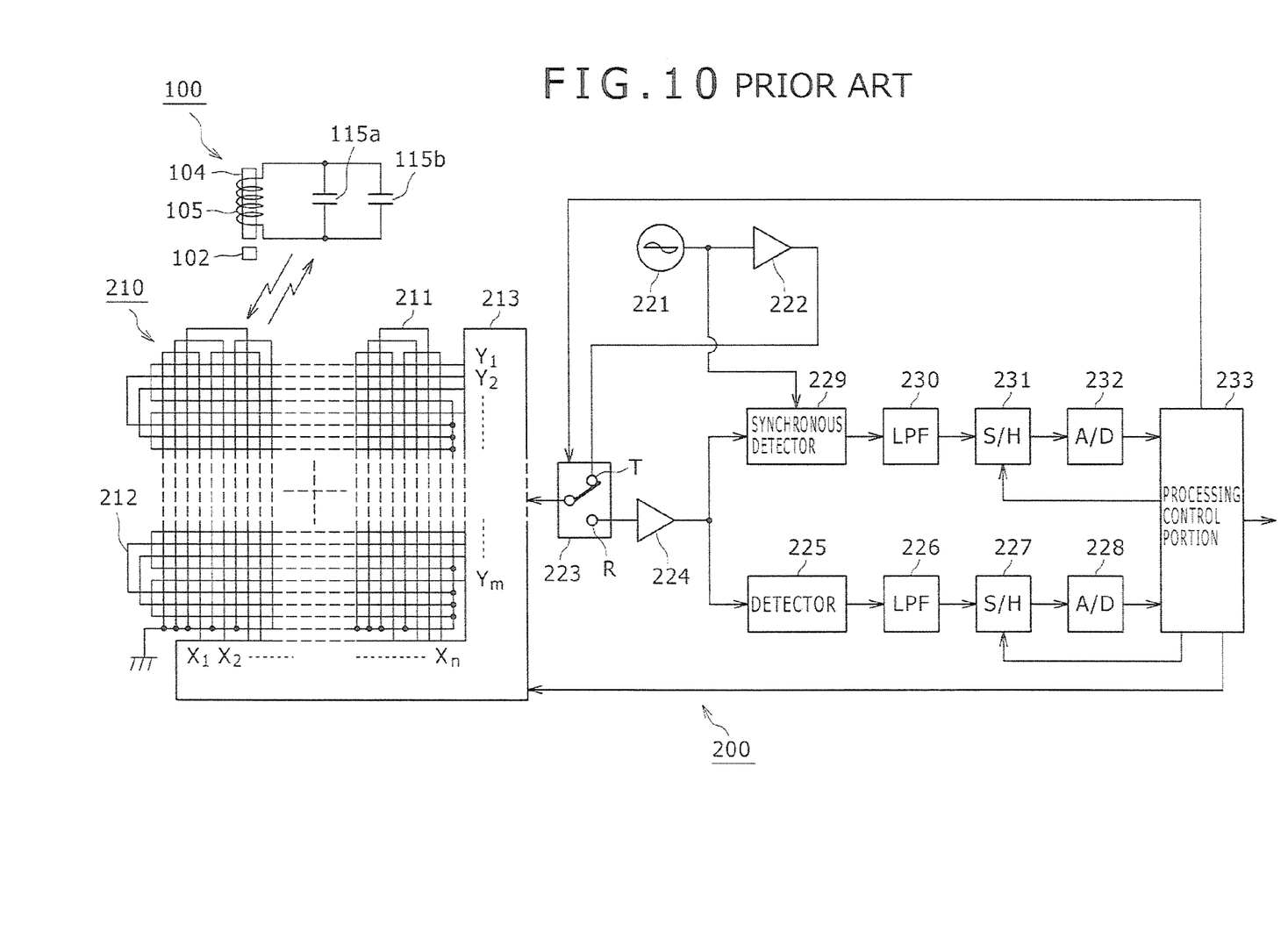
FIG. 10 is a block diagram illustrating an example of a conventional position input device.

In recent years, a position input device has been used as an input device for a tablet type Personal Computer (PC) or the like. The position input device is composed, for example, of a coordinate indicator formed in a pen shape (pen type coordinate indicator), and a position detector having an input surface on which a pointing operation and other operations to input characters, drawings, or the like, are carried out by using the pen type coordinate indicator. FIG. 10 shows an example of a schematic configuration of a conventional pen type coordinate indicator 100 and a conventional position detector 200.

In terms of a circuit configuration, the pen type coordinate indicator 100 includes a ferrite core 104, and a ferrite chip 102 as shown in the top left portion of FIG. 10. Also, one or more resonance capacitors 115 are connected to a coil 105, which is wound around the ferrite core 104. Referring to FIG. 10, there is shown the case where two resonance capacitors 115a and 115b are connected to the coil 105.

Figure 11:
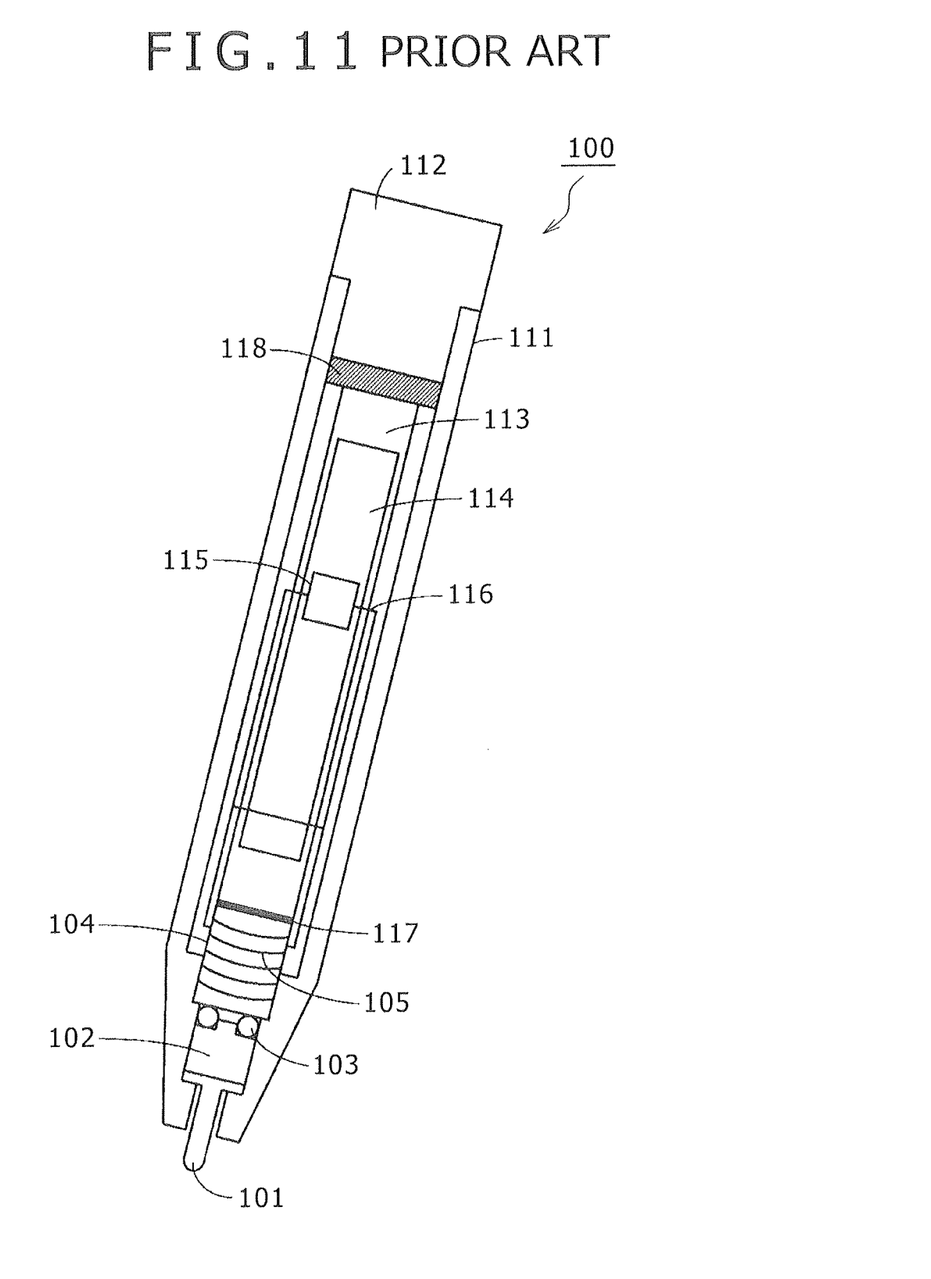
FIG. 11 is a view illustrating an example of a conventional pen type coordinate indicator shown in FIG. 10.

FIG. 11 shows a more concrete configuration of the pen type coordinate indicator 100. Although FIG. 11 is a cross sectional view of the pen type coordinate indicator 100, for the purpose of illustration, FIG. 11 shows a state in which the coil 105 is wound around the ferrite core (i.e., the first ferrite core) 104. As shown in FIG. 11, the pen type coordinate indicator 100 is configured in such a way that the first ferrite core 104, around which the coil 105 is wound, and the ferrite chip (i.e., second ferrite core) 102 are arranged to face each other through an O ring 103 and the second ferrite core 102 comes close to the first ferrite core 104 when a pressing pressure (pen pressure) is applied to a core body 101.

It is noted that the O ring 103 is a ring-like member which is obtained by forming a synthetic resin, a synthetic rubber or the like into an alphabetical character "O"-like shape. In addition, in the pen type coordinate indicator 100, in addition to the constituent elements described above, as shown in FIG. 11, a board holder 113, a board 114, the resonance capacitor 115, a resonance circuit 116, a ring-shaped film 117, and a buffer member 118 are accommodated in a hollow case 111, and they are fixed in their respective positions by a cap 112. The second ferrite core 102, with which the core body 101 composing a pen tip is in contact, comes close to the first ferrite core 104 in accordance with the pressing pressure applied to the core body 101, and in response to this action, an inductance value of the coil 105 is changed and thus a phase (resonance frequency) of an electric wave transmitted from the coil 105 of the resonance circuit 116 is changed.

On the other hand, as shown in FIG. 10, the position detector 200 includes a position detecting coil 210 in which an X-axis direction loop coil group 211 and a Y-axis direction loop coil group 212 are layered on top of each other. Each of the X-axis direction loop coil group 211 and the Y-axis direction loop coil group 212 is composed, for example, of 40 rectangular loop coils. The loop coils composing each of the X-axis direction loop coil group 211 and the Y-axis direction loop coil group 212 are disposed in such a way that they are arranged at an equal interval and are superposed one upon another in order. The X-axis direction loop coil group 211 and the Y-axis direction loop coil group 212 are both connected to a selection circuit 213. The selection circuit 213 successively selects one of the loop coils of the X-axis direction loop coil group 211 and the Y-axis direction loop coil group 212.

An oscillator 221 generates an AC (alternating-current) signal having a frequency f0, which is supplied from the oscillator 221 to each of a current driver 222 and a synchronous detector 229. The current driver 222 converts the AC signal supplied thereto from the oscillator 221 into an AC current, which is supplied from the current driver 222 to a switching connection circuit 223. The switching connection circuit 223 switches a connection destination (a transmission side terminal T or a reception side terminal R), to which the loop coil selected by the selection circuit 213 is connected, in accordance with the control by a processing control portion 233 which will be described later. The current driver 222 is connected to the transmission side terminal T, while a reception amplifier 224 is connected to the reception side terminal R.

An induced voltage, which is generated in the loop coil selected by the selection circuit 213, is supplied to the reception amplifier 224 through both of the selection circuit 213 and the switching connection circuit 223. The reception amplifier 224 amplifies the induced voltage supplied thereto from the loop coil, and supplies the resulting voltage to each of a detector 225 and the synchronous detector 229. The detector 225 detects the induced voltage generated in the loop coil, that is, the received signal, which is supplied from the detector 225 to a low-pass filter 226. The low-pass filter 226 has a cut-off frequency which is sufficiently lower than the frequency f0 described above, and converts the output signal supplied thereto from the detector 225 into a DC (direct-current) signal, which is supplied from the low-pass filter 226 to a sample-and-hold circuit 227. The sample-and-hold circuit 227 holds a voltage value at a predetermined timing of the output signal supplied thereto from the low-pass filter 226, specifically, at a predetermined timing during a reception period of time, and supplies the voltage thus held therein to an A/D conversion circuit 228. The A/D conversion circuit 228 converts the analog output signal supplied thereto from the sample-and-hold circuit 227 into a digital signal, which is supplied from the A/D conversion circuit 228 to the processing control portion 233.

The synchronous detector 229 synchronously detects the output signal supplied thereto from the reception amplifier 224, by using the AC signal supplied thereto from the oscillator 221, and supplies a signal set at a level corresponding to a phase difference between the output signal from the reception amplifier 224 and the AC signal from the oscillator 221 to a low-pass filter 230. The low-pass filter 230 has a cut-off frequency, which is sufficiently lower than the frequency f0, and converts the output signal supplied thereto from the synchronous detector 229 into a DC signal, which is supplied from the low-pass filter 230 to a sample-and-hold circuit 231. The sample-and-hold circuit 231 holds a voltage value at a predetermined timing of the output signal supplied thereto from the low-pass filter 230, and supplies the voltage thus held therein to an A/D conversion circuit 232. The A/D conversion circuit 232 converts the analog output signal supplied thereto from the sample-and-hold circuit 231 into a digital signal, which is supplied to the processing control portion 233.

The processing control portion 233 controls operations of the respective portions of the position detector 200. For example, the processing control portion 233 controls the selection of the loop coil in the selection circuit 213, the switching operation of the switching correction circuit 223, and the timings of the sample-and-hold circuits 227 and 231. The processing control portion 233 controls to have the X-axis direction loop coil group 211 and the Y-axis direction loop coil group 212 transmit an electric wave for a given transmission duration time based on input signals from the A/D conversion circuits 228 and 232.

Induced voltages are generated in the loop coils of the X-axis direction loop coil group 211 and the Y-axis direction loop coil group 212 by the electric wave transmitted from the pen type coordinate indicator 100. The processing control portion 233 calculates a coordinate value of the position in the X-axis direction and the Y-axis direction as indicated by the pen type coordinate indicator 100 based on levels of voltage values of the induced voltages generated in the loop coils. In addition, the processing control portion 233 detects the pen pressure based on the phase difference between the transmitted electric wave and the received electric wave.

In such a manner, in the conventional position input device composed of the pen type coordinate indicator 100 and the position detector 200, it is possible to detect not only the position indicated by the pen type coordinate indicator 100, but also the pressing pressure applied to the pen type coordinate indicator 100, that is, the pen pressure. Some details of the conventional pen type coordinate indicator 100 as described with reference to FIGS. 10 and 11 are described in Patent Document 1 of Japanese Patent Laid-Open No. 2002-244806.

BRIEF SUMMARY

In the case of the conventional position input device which has been described with reference to FIGS. 10 and 11, when a change in the phase (frequency) of the electric wave from the pen type coordinate indicator 100 exceeds a predetermined threshold value, the position detector 200 detects that a pen pressure is applied to the pen type coordinate indicator 100. The predetermined threshold value is provided so as to prevent erroneous detection of the pen pressure. Specifically, in the case of the conventional pen type coordinate indicator 100, it is possible that even when the conventional pen type coordinate indicator 100 is merely inclined (or tilted) with respect to the position detector 200, the inductance value of the coil 105 is changed and thus the phase of the electric wave transmitted from the pen type coordinate indicator 100 is changed, which leads to erroneous detection of a pen pressure. By providing the predetermined threshold value as a detection margin, a so-called dead zone is provided, and it becomes possible to precisely detect only the case in which a pen pressure is truly applied.

However, in the case of the conventional pen type coordinate indicator 100, in order to cause the second ferrite core (ferrite chip) 102 to move closer to the first ferrite core 104 by crushing the O ring 103, a large pen pressure (load) needs to be applied to the core body 101 of the pen type coordinate indicator 100. In addition, when the O ring 103 is crushed, there is a limit to the deformation of the O ring 103. Thus, when the pressing pressure equal to or larger than a certain value is applied through the core body 101, the second ferrite core 102 collides with the first ferrite core 104 and an interval between the second ferrite core 102 and the first ferrite core 104 does not become smaller. As a result, it may become impossible to change the phase (frequency) of the electric wave supplied from the pen type coordinate indicator 100 in accordance with the pressing pressure. Thus, in the case of the pen type coordinate indicator 100, the range in which a changing pressing pressure (pen pressure) can be detected is narrow to start with. Furthermore, as described above, because a predetermined threshold value needs to be provided with respect to the change in the phase (frequency) of the electric wave supplied from the pen type coordinate indicator 100, the range of the load change in which the pressing pressure (pen pressure) can be detected becomes even narrower.

As one method of solving this problem, it may be attempted to increase the interval between the first ferrite core 104 and the second ferrite core 102. The method can be realized relatively simply because, in this case, it is not necessary to modify the parts or components composing the pen type coordinate indicator 100. In this method, however, the second ferrite core 102 comes close to the first ferrite core 104 even when a user simply holds the pen type coordinate indicator 100 in such a way that the core body 101 is pointed upward. In this case, the phase of the electric wave supplied from the pen type coordinate indicator 100 is changed, which may lead to erroneous detection of a pen pressure.

According to one aspect, the present invention is directed to solving the problems described above. According to exemplary embodiments, a pen type coordinate indicator for a position input device is provided, which is capable of preventing erroneous detection of a pressing pressure (pen pressure), while having an increased detection range of a pressing pressure applied to a pen tip, to thereby more precisely detect a change in the pressing pressure.

According to an aspect of the present invention, there is provided a pen type coordinate indicator including:

a core body protruding from one end of a chassis and composing a pen tip;

a first magnetic body having a distal end surface contacting the core body and being wound-around by a coil;

a second magnetic body disposed in such a way that a distal end surface thereof faces a proximal end surface of the first magnetic body on a side opposite to a side of the core body; and a first elastic body and a second elastic body interposed between the end surfaces of the first magnetic body and the second magnetic body facing each other, wherein a distance between the end surfaces of the first and second magnetic bodies facing each other is changed when a pressing pressure is applied to the core body, such that the indicator has a pressing pressure sensitivity, wherein at least the first elastic body is elastically deformed by a pressing pressure to cause the end surface of the first magnetic body or the end surface of the second magnetic body to come in contact with the second elastic body, and thereafter in addition to the first elastic body, the second elastic body is elastically deformed by a further pressing pressure, such that the indicator has a pressing pressure sensitivity corresponding to the changing distance between the end surfaces of the first and second magnetic bodies facing each other.

According to the pen type coordinate indicator of the present invention, although the distance between the end surfaces of the first and second magnetic bodies facing each other is changed by the pressing pressure applied to the core body, both of the first and second elastic bodies are interposed between the end surfaces of the first and second magnetic bodies facing each other. Thus, even when a larger pressing pressure is applied to the core body, the distance between the end surfaces of the first and second magnetic bodies facing each other is gradually narrowed due to the first and second elastic bodies. As a result, it is possible to widen the detection range of the pressing pressure.

Specifically, until the distance between the end surfaces of the first and second magnetic bodies facing each other reaches a predetermined distance value, at least the first elastic body is elastically deformed, and thus the distance between the end surfaces of the first and second magnetic bodies facing each other is narrowed. Therefore, until the distance between the end surfaces of the first and second magnetic bodies facing each other reaches the predetermined distance value, the inductance value of the coil is changed mainly at the sensitivity corresponding to the first elastic body, whereby it is possible to change the phase (frequency) of the electric wave to be transmitted.

In addition, after the distance between the end surfaces of the first and second magnetic bodies facing each other has reached the predetermined distance value, in addition to the first elastic body, the second elastic body is elastically deformed, and thus the distance between the end surfaces of the first and second magnetic bodies facing each other is further narrowed. At this point, when the distance between the end surfaces of the first and second magnetic bodies facing each other becomes shorter (narrower) than the predetermined distance value, the inductance value of the coil is changed mainly at the sensitivity corresponding to the second elastic body, whereby it is possible to change the phase (frequency) of the electric wave to be transmitted.

In such a manner, the first and second elastic bodies are interposed between the end surfaces of the first and second magnetic bodies facing each other, whereby it is possible to prevent erroneous detection of a pressing pressure when the core body is directed upward and, at the same time, it becomes possible to widen the range of the detectable pressing pressure. In addition, the detection sensitivity of the pressing pressure (pressing pressure sensitivity) can be adjusted as a function of the first and second elastic bodies. As a result, it is possible to realize the pen type coordinate indicator, in which the inductance value of the coil can be more desirably changed in accordance with the pressing pressure, and thus the phase (frequency) can be desirably changed in accordance with the pressing pressure.

As set forth hereinabove, according to various embodiments of the present invention, it is possible to realize the pen type coordinate indicator of the position input device which is capable of preventing erroneous detection when, for example, the core body is directed upward and, at the same time, the detection range of the pressing pressure applied to the pen tip is widened, thereby making it possible to more precisely detect the change in the pressing pressure.

DETAILED DESCRIPTION

A pen type coordinate indicator according to an embodiment of the present invention will be described in detail hereinafter with reference to the accompanying drawings.

Figure 1:
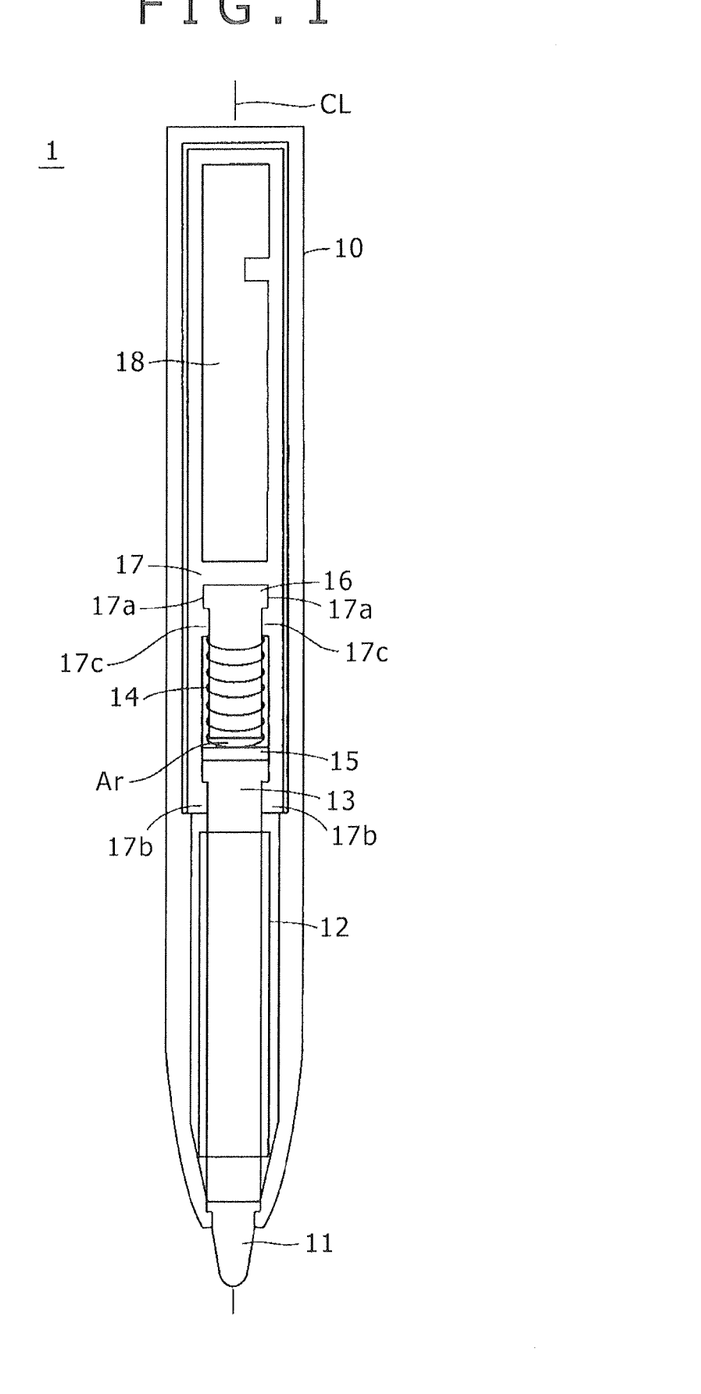
FIG. 1 is a view illustrating a structure of a pen type coordinate indicator according to an embodiment of the present invention.
Figure 2:
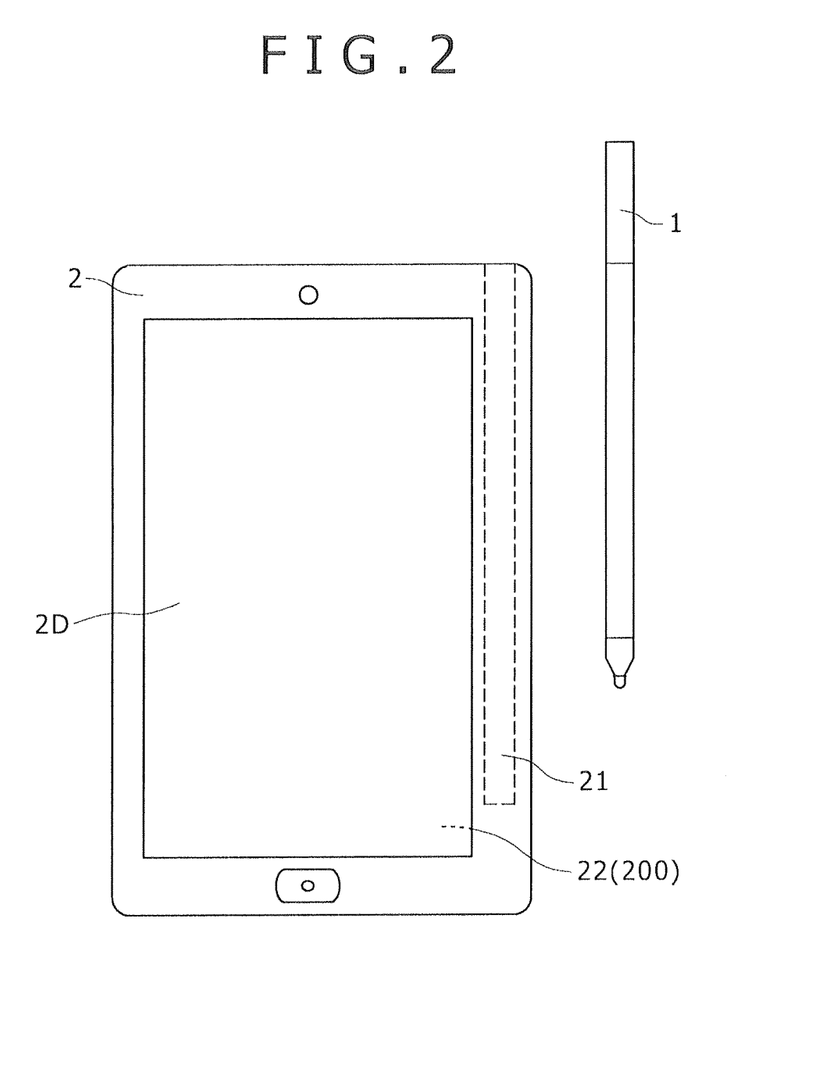
FIG. 2 is a top plan view illustrating an example of an electronic apparatus that includes a pen type coordinate indicator according to an embodiment of the present invention.

FIG. 1 is a view illustrating a structure of a pen type coordinate indicator 1 according to an embodiment of the present invention. FIG. 2 is a top plan view illustrating an example of an electronic apparatus 2 that includes the pen type coordinate indicator 1 according to the present embodiment. In the case shown in FIG. 2, the electronic apparatus 2 is, for example, a high-performance cellular phone unit including a display screen 2D of a display device such as a Liquid Crystal Display (LCD) device. The electronic apparatus 2 includes an electromagnetic induction type position detector 22 on the back side of the display screen 2D. The electromagnetic induction type position detector 22 is configured similarly to the conventional position detector 200, which was described with reference to FIG. 10.

A chassis of the electronic apparatus 2 in this example includes an accommodation recessed hole 21 for accommodating therein the pen type coordinate indicator 1. In use, a user removes the pen type coordinate indicator 1 accommodated in the accommodation recessed hole 21 from the electronic apparatus 2, and carries out a position indicating operation on the display screen 2D of the electronic apparatus 2.

In the electronic apparatus 2, when a position indicating operation is carried out on the display screen 2D of the electronic apparatus 2 by using the pen type coordinate indicator 1, the position detector 22 provided on the back side of the display screen 2D detects both the position and a pen pressure indicated by the operation of the pen type coordinate indicator 1. A microcomputer provided in the position detector 22 of the electronic apparatus 2 executes display processing in accordance with both of the operation position and the pen pressure as indicated on the display screen 2D.

[Structure of Pen Type Coordinate Indicator 1]

FIG. 1 shows a schematic internal structure of the pen type coordinate indicator 1, from which a half of a case 10 and a holder 17 of the pen type coordinate indicator 1 is cut out and removed. Referring to FIG. 1, the case 10 is a chassis made of a synthetic resin, such as an ABS resin, or a metal, formed in a smaller (compact) shape similar to conventional writing implements such as a ballpoint pen or a mechanical pencil. The case 10 is hollow in order to accommodate therein parts, which will be described below. In addition, as shown in FIG. 1, the case 10 is formed in such a way that at least one (distal) end portion thereof becomes thinner, and a tip portion thereof has an opening.

A core body 11, which composes the pen tip and protrudes from the opening of the case 10, is disposed in the thinner tip portion of the case 10. In a proximal end portion of the core body 11 located inside the case 10, a protrusion portion to engage with the opening of the case 10 is provided as shown in FIG. 1, to constitute a structure in which the core body 11 is prevented from falling off from the case 10. It is noted that the core body 11 is made of a synthetic resin, such as a polyacetal resin (DURACON: registered trademark), so as to withstand the friction caused when the core body 11 is brought in contact with the operation surface.

As shown in FIG. 1, the first ferrite core 13 is provided such that its distal end surface is brought into contact with the proximal end surface of the proximal end portion of the core body 11. The first ferrite core 13 is a column-like (rod-like) magnetic material member, with a radial cross-section (when the first ferrite core 13 is cut in a direction intersecting with a longitudinal direction) having a circular shape or a rectangular shape. As shown in FIG. 1, a coil 12 is finely wound around a side surface of the first ferrite core 13. The coil 12 is connected to a resonance circuit (not shown) on a board 18, which will be described later.

In addition, as shown in FIG. 1, a second ferrite core 16 is provided such that its distal end surface faces the proximal end surface of the first ferrite core 13, on a side opposite to the side of the core body 11. The second ferrite core 16 is also a column-like (rod-like) magnetic material member, with a radial cross-section (when the second ferrite core 16 is cut in a direction intersecting with the longitudinal direction) having a circular shape or a rectangular shape. The proximal end surface of the first ferrite core 13 and the distal end surface of the second ferrite core 16 face each other.

Also, as shown in FIG. 1, the proximal end portion of the second ferrite core 16 on the side opposite to the first ferrite core 13 is provided with a protrusion portion 17c protruding (radially) outwardly. The protrusion portion 17c is fitted into a recessed portion 17a of the holder 17. As a result, the second ferrite core 16 is regulated (fixed) in its position and will not move within the case 10.

As shown in FIG. 1, the proximal end portion of the first ferrite core 13 is provided with a protrusion portion, which protrudes (radially) outwardly. This protrusion portion is engaged with a protrusion portion 17b of the holder 17. As a result, movement of the first ferrite core 13 in the direction toward the core body 11 within the case 10 is regulated. In other words, the first ferrite core 13 is made slidable in a predetermined range in a direction (in a longitudinal direction) along a center line CL of the pen type coordinate indicator 1 within the case 10. The sliding (movement) of the first ferrite core 13 toward the core body 11 direction is regulated by the protrusion portion 17b of the holder 17.

As shown in FIG. 1, a coil spring 14 as a first elastic body is provided between the first ferrite core 13 and the second ferrite core 16, and a sheet-like silicon rubber (silicon rubber) 15 as a second elastic body is also provided between the first ferrite core 13 and the second ferrite core 16. In the present embodiment of the present invention, the sheet-like silicon rubber 15 is provided over the entire surface of the proximal end surface of the first ferrite core 13 facing the distal end surface of the second ferrite core 16. In addition, an air gap Ar having a predetermined thickness is provided between the silicon rubber 15 and the second ferrite core 16.

It is noted that in the present embodiment of the present invention, a modulus of elasticity of the coil spring 14 is smaller than that of the silicon rubber 15. That is to say, when k1 is the modulus of elasticity of the coil spring 14, and k2 is the modulus of elasticity of the silicon rubber 15, a relationship of k1<k2 holds. Therefore, the coil spring 14 is elastically deformed with a smaller pressing pressure than that required to deform the silicon rubber 15, and the silicon rubber 15 is not elastically deformed unless a large pressing pressure than that required to deform the coil spring 14 is applied to the silicon rubber 15.

In addition, as shown in FIG. 1, the coil spring 14 is provided such that a portion thereof is wound around the side surface of the second ferrite core 16, while one end of the coil spring 14 is brought into contact with the protrusion portion 17c of the holder 17, and the other end thereof is brought into contact with the silicon rubber 15 provided on the proximal end surface of the first ferrite core 13. As a result, the coil spring 14 is elastically biased between the two abutment portions—the protrusion portion 17c of the holder 17, and the silicon rubber 15—and thus operates so as to push the proximal end surface of the first ferrite core 13 away from the distal end surface of the second ferrite core 16 whose position is fixed within the case 10. That is to say, the coil spring 14 functions as if the coil spring 14 is provided between the proximal end surface of the first ferrite core 13 and the distal end surface of the second ferrite core 16.

It is noted that the coil spring 14 is provided to be wound around the side surface of the second ferrite core 16, whereby the following advantages are offered. The coil spring 14 having the predetermined modulus of elasticity, k1, can be interposed between the first ferrite core 13 and the second ferrite core 16, without the coil spring 14 itself getting in the way of the approach between the first ferrite core 13 and the second ferrite core 16.

Also, as shown in FIG. 1, the board 18 described above is provided on the upper (distal) side of the second ferrite core 16. The board 18 is, for example, a printed wiring board, to which a resonance capacitor and the like are mounted, and is fixed within the case 10 by the holder 17. The resonance circuit (tuning circuit) is configured to include the elements such as the resonance capacitor mounted onto the board 18, and the coil 12 wound around the first ferrite core 13. That is to say, the pen type coordinate indicator 1 of the present embodiment includes a circuit equivalent to that of the conventional pen type coordinate indicator 100, which is shown in the top left of FIG. 10.

The pen type coordinate indicator 1 of the present embodiment configured in such a manner is operated on the position detector 22 of the electronic apparatus 2 shown in FIG. 2. In the pen type coordinate indicator 1 of the present embodiment, both of the coil spring 14 and the silicon rubber 15 are interposed between the first ferrite core 13 and the second ferrite core 16. As a result, since the first ferrite core 13 is pushed away from the second ferrite core 16 mainly based on the operation of the coil spring 14, even when the core body 11 is directed (pointed) upward, the first ferrite core 13 and the second ferrite core 16 are prevented from coming close to each other. Therefore, even when the core body 11 is held so as to be directed upward for example, erroneous detection of a pressing pressure can be prevented.

In addition, the detection range of the pressing pressure (pen pressure) applied to the core body 11 can be widened based on both of the operations of the coil spring 14 and the silicon rubber 15. Furthermore, the electric wave whose phase (frequency) is precisely changed in accordance with the pressing pressure can be transmitted to the position detector 22, thereby making it possible to precisely detect the pressing pressure (pen pressure). Next, functions of the coil spring 14 and the silicon rubber 15 in the pen type coordinate indicator 1 of the embodiment will be further described.

[Structure of Main Portion of Pen Type Coordinate Indicator 1]

Figure 3A:
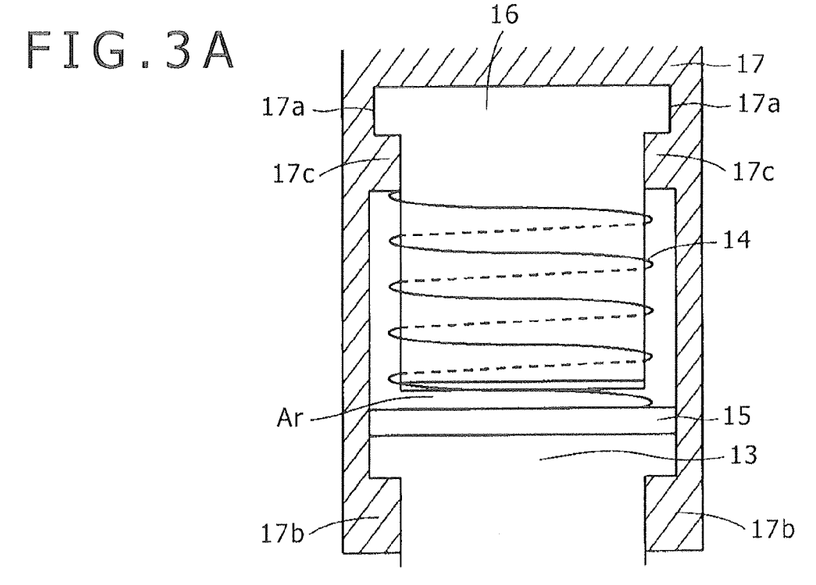
FIGS. 3A and 3B are enlarged views, each showing a portion in which a proximal end surface of a first ferrite core and a distal end surface of a second ferrite core face each other in the pen type coordinate indicator according to an embodiment of the present invention.
Figure 3B:
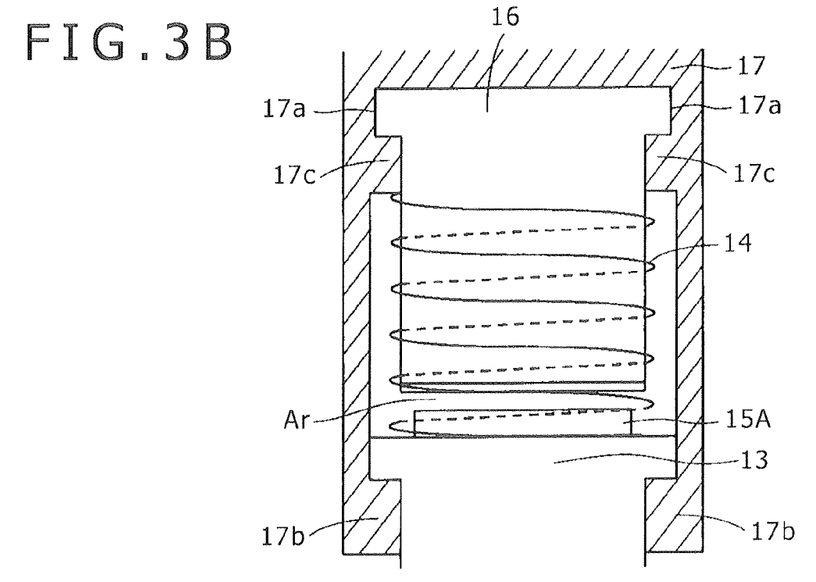

FIGS. 3A and 3B are enlarged views, each showing the portion of the pen type coordinate indicator 1 of the embodiment shown in FIG. 1, in which the proximal end surface of the first ferrite core 13 and the distal end surface of the second ferrite core 16 face each other. As shown in FIG. 3A, the pen type coordinate indicator 1 of the present embodiment has a structure, in which the first ferrite core 13, the silicon rubber 15, the coil spring 14, and the second ferrite core 16 are serially disposed in this order from the side of the core body 11 (from the lower side in the figure). Also, in the pen type coordinate indicator 1 of the present embodiment, the air gap Ar having the predetermined thickness is provided between the silicon rubber 15 and the second ferrite core 16.

As also described above, the coil spring 14 is elastically biased between the protrusion portion 17c of the holder 17, and the silicon rubber 15, and thus operates to push the proximal end surface of the first ferrite core 13 away from the distal end surface of the second ferrite core 16 whose position is fixed within the case 10. As a result, even when the pen type coordinate indicator 1 of the embodiment is, for example, inclined, shaken, or held such that the core body 11 is directed upward, the proximal end surface of the first ferrite core 13 is prevented from coming close to the distal end surface of the second ferrite core 16. That is to say, even when the pen type coordinate indicator 1 of the embodiment is inclined, shaken, or held such that the core body 11 is directed upward, the inductance value of the coil 12 wound around the first ferrite core 13 is prevented from being changed. As a result, the phase of the electric wave transmitted from the pen type coordinate indicator 1 can be prevented from being unnecessarily (or undesirably) changed, and thus erroneous detection of the pressing pressure (pen pressure) applied to the pen type coordinate indicator 1 on the position detector 22 of the electronic apparatus 2 can be prevented.

Also, similarly to conventional writing implements, the pen type coordinate indicator 1 is operated in such a way that the core body 11 is pressed against the display screen 2D of the electronic apparatus 2. Therefore, during operation of the pen type coordinate indicator 1, the core body 11 is pressed into the inside of the case 10, whereby the first ferrite core 13 around which the coil 12 is wound is pressed together with the core body 11 toward the second ferrite core 16.

Figure 4A:
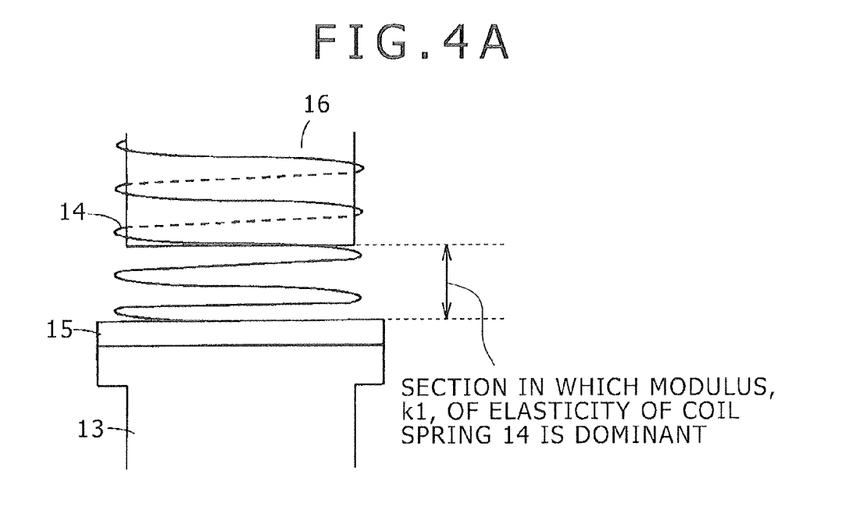
FIGS. 4A and 4B are views each illustrating operations of a coil spring and a silicon rubber.
Figure 4B:
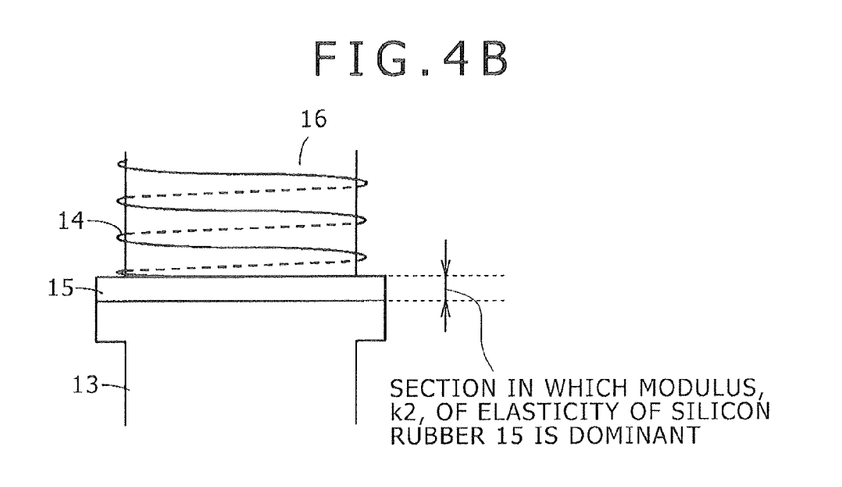

FIGS. 4A and 4B are views each illustrating the operations of the coil spring 14 and the silicon rubber 15 when the pressing pressure is applied to the core body 11. It is supposed that the pressing pressure is applied to the core body 11 and thus the first ferrite core 13 is pressed toward the second ferrite core 16. In this case, as shown in FIG. 4A, firstly, the coil spring 14 whose modulus of elasticity, k1, is smaller than the modulus of elasticity, k2, of the silicon rubber 15 is elastically deformed to contract, and thus the first ferrite core 13 comes close to the second ferrite core 16. When the coil spring 14 is further pressed (contracted) as shown in FIG. 4B, the silicon rubber 15 is pressed against the distal end surface of the second ferrite core 16 and the silicon rubber 15 is elastically deformed, and thus the first ferrite core 13 further comes close to the second ferrite core 16.

In the present embodiment of the present invention, since as described above, the modulus of elasticity is smaller in the coil spring 14 than in the silicon rubber 15, as shown in FIG. 4A, in a section in which mainly the coil spring 14 is elastically deformed, the first ferrite core 13 comes close to the second ferrite core 16 relatively rapidly. On the other hand, as shown in FIG. 4B, in a section in which the silicon rubber 15 is also elastically deformed, since the modulus of elasticity, k2, of the silicon rubber 15 is larger than the modulus of elasticity, k1, of the coil spring 14, the first ferrite core 13 only gradually comes close to the second ferrite core 16 in accordance with the pressing pressure.

Accordingly, in the pen type coordinate indicator 1 of the present embodiment, the section in which the inductance value of the coil 12 wound around the first ferrite core 13 is changed in accordance with the pressing pressure (pen pressure) applied to the core body 11 is widened by both of the operations of the coil spring 14 and the silicon rubber 15. In addition, in the pen type coordinate indicator 1 of the present embodiment, both the section in which mainly the coil spring 14 operates, and the section in which mainly the silicon rubber 15 operates are provided. Thus, the two sections in which the first ferrite core 13 comes close to the second ferrite core 16 in two different manners, respectively, are provided, thereby making it possible to detect a change in the inductance value corresponding to the pressing pressure with higher sensitivity.

[Verification of Effects]

Figure 5:
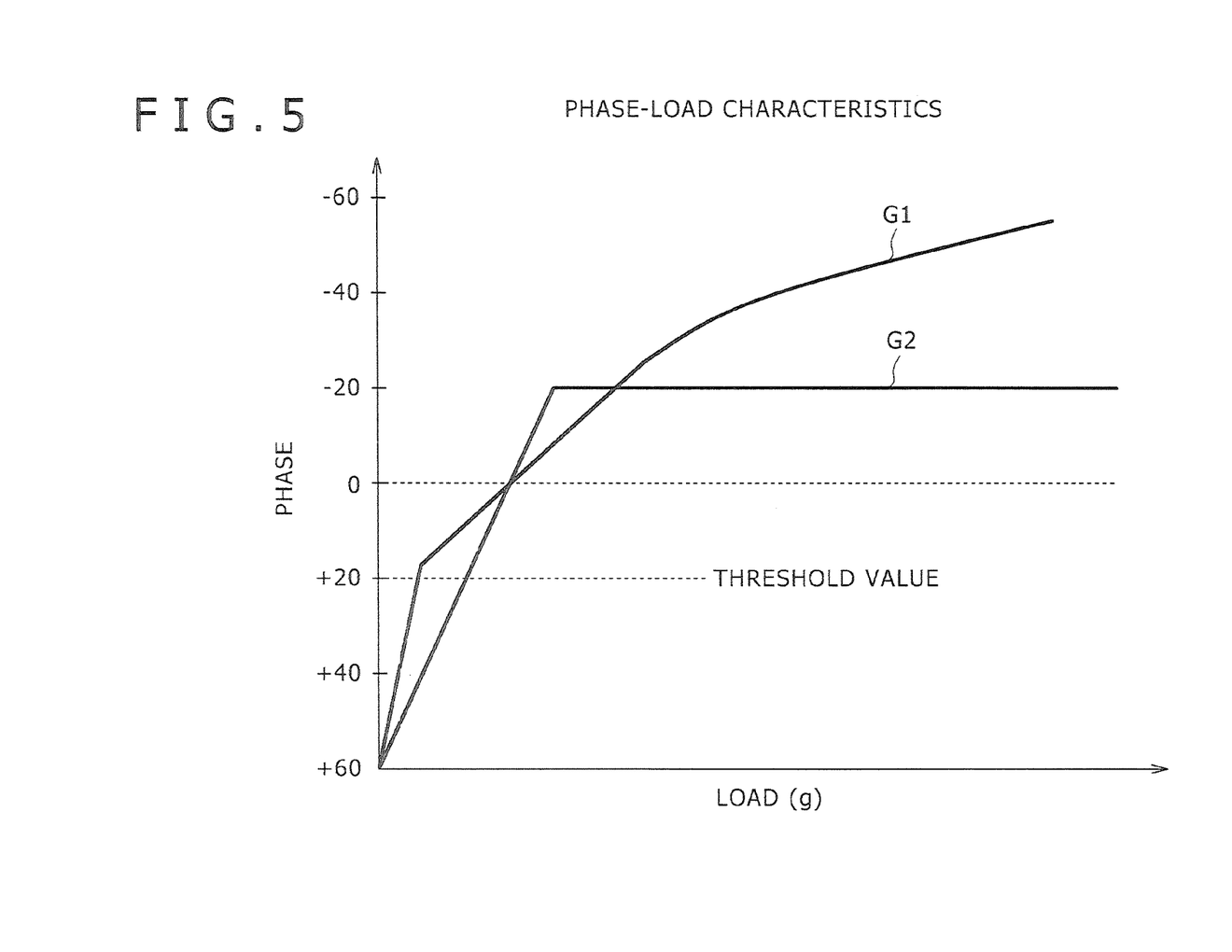
FIG. 5 is a graph illustrating phase-load characteristics of the pen type coordinate indicator according to an embodiment of the present invention and of a conventional pen type coordinate indicator.

FIG. 5 is a graph illustrating phase-load characteristics of the pen type coordinate indicator according to the present embodiment of the present invention and of the conventional pen type coordinate indicator shown in FIGS. 10 and 11. Referring to FIG. 5, a graph G1 shows the phase-load characteristics of the pen type coordinate indicator 1 according to the present embodiment. A graph G2 shows the phase-load characteristics of the conventional pen type coordinate indicator 100 previously described with reference to FIGS. 10 and 11.

In the case of the conventional pen type coordinate indicator 100, as previously described with reference to FIG. 11, the O ring 103 exists between the first ferrite core 104 and the second ferrite core (ferrite chip) 102. For this reason, in order for the second ferrite core 102 to come close to the ferrite core 104 by crushing the O ring 103, a large pressing pressure (large load) needs to be applied to the core body 101 of the conventional pen type coordinate indicator 100. In addition, crushing of the O ring 103 has a limit.

For this reason, in the case of the conventional pen type coordinate indicator 100, in a section at the beginning when the pressing load is relatively light, the inductance value of the coil 105 changes relatively largely, and thus as shown in the graph G2 of FIG. 5, a relatively large change in the phase is obtained in this section. However, when a pressing pressure equal to or more than a defined pressing pressure is applied to the core body 101, the first ferrite core 104 and the second ferrite core 102 collide against each other such that the distance between the first ferrite core 104 and the second ferrite core 102 cannot be further narrowed, which results in the change in the phase being fixed to a predetermined value (close to 0 change). Also, as previously stated, since the change in the phase in the pen type coordinate indicator 100 is not detected until it exceeds a predetermined threshold value, in the case of the characteristics shown in the graph G2 of FIG. 5, the pressing pressure (pen pressure) applied by the user can be detected only in the range of the change in the phase of about +20 to about −20.

On the other hand, in the case of the pen type coordinate indicator 1 of the present embodiment, the structure is adopted in which, as previously stated with reference to FIG. 1, FIGS. 3A and 3B, and FIGS. 4A and 4B, both of the coil spring 14 and the silicon rubber 15 are interposed between the first and second ferrite cores 13 and 16 whose end surfaces face each other. For this reason, when the pressing pressure (pen pressure) is applied to the core body 11, as previously stated with reference to FIG. 4A, the coil spring 14 whose modulus of elasticity, k1, is smaller than the modulus of elasticity, k2, of the silicon rubber 15 acts first. In this case, since the first ferrite core 13 comes close to the second ferrite core 16 relatively quickly, the inductance value of the coil 12 is also quickly changed. As a result, as shown in the graph G1 of FIG. 5, in a section at the beginning when the pressing load is relatively light, the change in the phase is steep.

Specifically, as shown in FIG. 1, FIGS. 3A and 3B, and FIGS. 4A and 4B, in the case of the present embodiment, the coil spring 14 and the silicon rubber 15 serially contact each other. For this reason, in the section (distance) until the distal end surface of the second ferrite core 16 comes to contact the silicon rubber 15, the influence of the coil spring 14 is dominant. In this section, the detection sensitivity of the pressing pressure (pen pressure) corresponds to a first modulus of elasticity which is determined based on both of the coil spring 14 and the silicon rubber 15.

When the pressing pressure is further applied to the core body 11 such that, as shown in FIG. 4B, the silicon rubber 15 is pressed against the distal end surface of the second ferrite core 16, the silicon rubber 15 is elastically deformed. In this case, since the silicon rubber 15 having the large modulus of elasticity, k2, is gradually deformed in accordance with the pressing pressure applied to the core body 11, the first ferrite core 13 gradually comes close to the second ferrite core 16.

In the state as shown in FIG. 4B, the modulus of elasticity, k1, of the coil spring 14 is assumed to have either exceeded a limit, or have reached an approximately fixed value that does not substantially influence the pressing pressure sensitivity. For this reason, in the case shown in FIG. 1, FIGS. 3A and 3B, and FIGS. 4A and 4B, when the second ferrite core 16 is brought into contact with the silicon rubber 15, the modulus of elasticity, k2, of the silicon rubber 15 becomes dominant. As a result, as shown in the graph G1 of FIG. 5, the phase is gradually changed in accordance with the pressing pressure applied to the core body 11. Due to the operation of the silicon rubber 15, it becomes possible to change the phase of the electric wave transmitted from the pen type coordinate indicator 1 over a wider range in which the load is changed than the range of the conventional pen type coordinate indicator 100.

Accordingly, the pen type coordinate indicator 1 of the present embodiment has the pressing pressure sensitivity corresponding to the first modulus of elasticity determined based on both of the coil spring 14 and the silicon rubber 15 until the distal end surface of the second ferrite core 16 contacts the silicon rubber 15. In the section (distance) after the distal end surface of the second ferrite core 16 has contacted the silicon rubber 15, the modulus of elasticity, k2, of the silicon rubber 15 becomes mainly dominant so as to have the pressing pressure sensitivity corresponding to a second modulus of elasticity, which is larger than the first modulus of elasticity described above.

In the pen type coordinate indicator 1 of the present embodiment, even when a predetermined threshold value is used with respect to the detection of the change in the phase similarly to the case of the conventional pen type coordinate indicator 100, as shown in the graph G1 of FIG. 5, the pressing pressure (pen pressure) can be detected in the range of the change in the phase from about +20 to the vicinity of −60. That is to say, the pen type coordinate indicator 1 of the embodiment is structured so that the pressing pressure (pen pressure) can be reliably detected, by mainly causing the coil spring 14 with the small modulus of elasticity, k1, to operate based on a relatively light load to achieve a large change in the phase until the defined threshold value is reached. Then, after the defined threshold value (the phase of +20 in FIG. 5) is exceeded, the silicon rubber 15 having the large modulus of elasticity, k2, is caused to mainly operate such that the change in the phase is generated in accordance with the applied load.

Accordingly, with the pen type coordinate indicator 1 of the present embodiment, erroneous detection of a pressing pressure when, for example, the core body 11 is directed upward, can be prevented, and at the same time, the detection range of the pressing pressure (pen pressure) is widened. Also, detection of the pressing pressure (pen pressure) can be flexibly, and more suitably carried out.

With reference to FIGS. 1 and 3A, the description has been given on the assumption that the silicon rubber 15 is provided on the entire proximal end surface of the first ferrite core 13. However, the present invention is by no means limited to this structure. As shown in FIG. 3B, the silicon rubber 15A provided on the proximal end surface of the first ferrite core 13, similarly to as shown in FIG. 3A, may have a size allowing the silicon rubber 15A to be accommodated in the inside of the coil spring 14 so as not to be brought into contact with the coil spring 14. In this case, since no portion of the silicon rubber 15A is brought into contact with the coil spring 14, when a pressing force begins to be applied to the core body 11, the phase of the electric wave transmitted from the pen type coordinate indicator 1 can be more steeply changed in accordance with the operation of only the coil spring 14.

Thereafter, when the pressing pressure is further applied to the core body 11 and thus the silicon rubber 15A and the distal end surface of the second ferrite core 16 are brought into contact with each other, from here on, the silicon rubber 15A having the large modulus of elasticity, k2, mainly operates. In this case, mainly by the operation of the silicon rubber 15A, the first ferrite core 13 and the second ferrite core 16 can be gradually made to come close to each other in terms of the distance. Therefore, in the case shown in FIG. 3B also, it is possible to obtain the same effects as those obtained in the case shown in FIGS. 1 and 3A.

It is noted that although in FIGS. 3A and 3B, the description has been given on the assumption that the silicon rubber 15, 15A is provided on the proximal end surface of the first ferrite core 13, the present invention is by no means limited to this structure. That is to say, the silicon rubber 15, 15A may also be provided on the distal end surface of the second ferrite core 16 facing the proximal end surface of the first ferrite core 13.

[Modified Changes]

Next, a description will be given with respect to pen type coordinate indicators 1 according to Modified Changes of the embodiment. Modified Changes described below are directed to changing the shape and the like of the part that forms the second elastic body interposed between the proximal end surface of the first ferrite core 13 and the distal end surface of the second ferrite core 16.

[Modified Change 1]

Figure 6A:
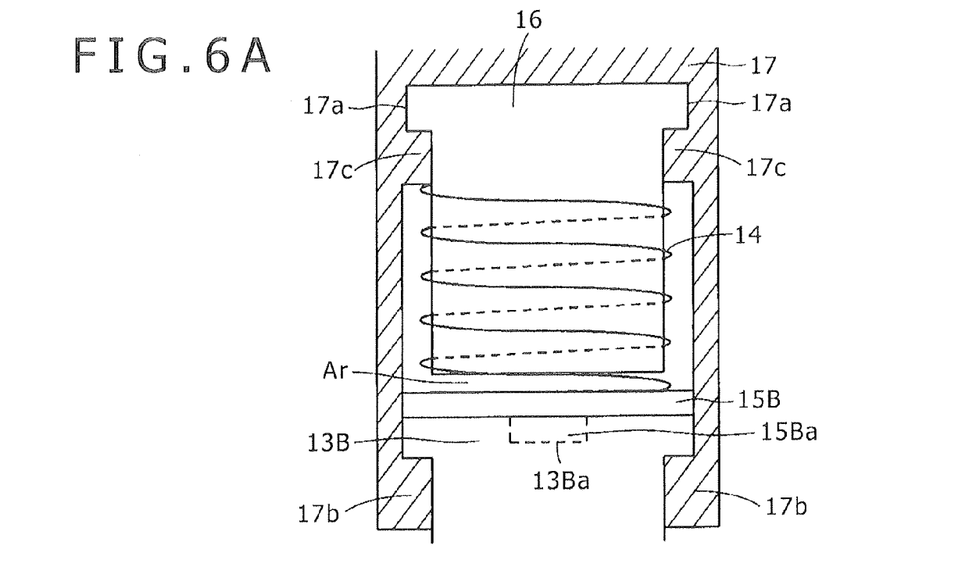
FIGS. 6A and 6B are views, each illustrating a pen type coordinate indicator according to Modified Change 1 of the embodiment of the present invention.
Figure 6B:
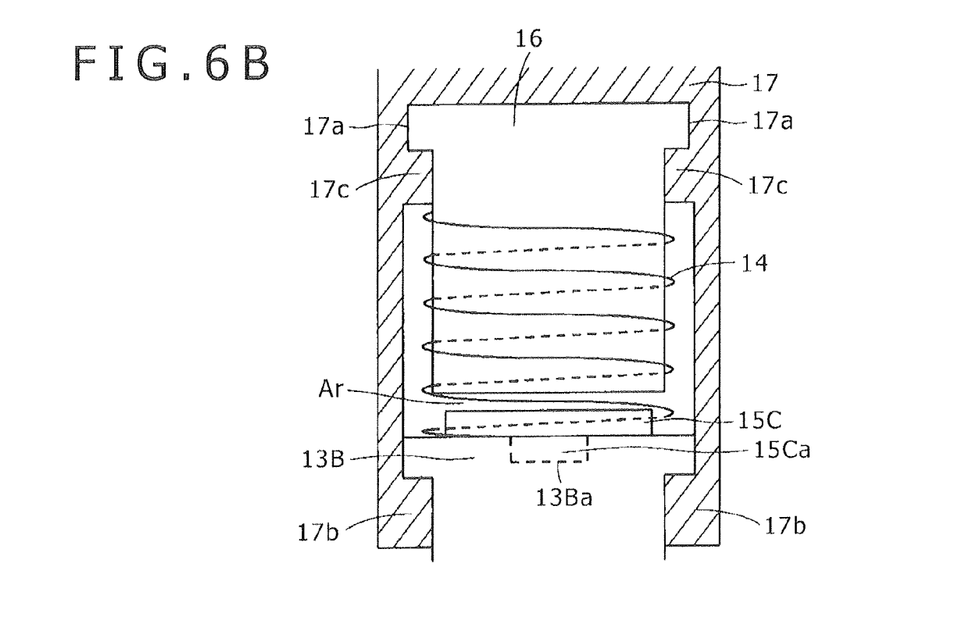

FIGS. 6A and 6B are views each illustrating a pen type coordinate indicator 1 according to Modified Change 1 of the embodiment. In the case of Modified Change 1 shown in FIGS. 6A and 6B, a recessed portion 13Ba is provided in a central portion of the proximal end surface of a first ferrite core 13B, on which a silicon rubber 15B, 15C is provided, respectively. In addition, a projecting portion 15Ba, 15Ca, which is fitted into the recessed portion 13Ba of the first ferrite core 13B, is provided in the central portion of the silicon rubber 15B, 15C as a second elastic body. Other constituent portions are structured similarly to the case of the pen type coordinate indicator 1 previously described with reference to FIG. 3.

By adopting such a structure, the silicon rubber 15B, 15C can be fixedly mounted to the end surface of the first ferrite core 13B so as not to be shifted in position from its intended position, and thus the manufacturing can be readily carried out. In addition, since the silicon rubber 15B, 15C is prevented from being shifted in position on the proximal end surface of the first ferrite core 13B during use of the pen, failure of the pen becomes unlikely also. In particular, this structure is effective in the case where, as shown in FIG. 6B, the silicon rubber 15C is located inside the coil spring 14.

In FIGS. 6A and 6B, although the description has been given with respect to the case where the silicon rubber 15B, 15C is provided on the proximal end surface of the first ferrite core 13B, the present invention is by no means limited to this structure. Alternatively, the silicon rubber 15B, 15C may also be provided on the distal end surface of the second ferrite core 16 opposite to the proximal end surface of the first ferrite core 13B. Therefore, a recessed portion may also be provided in a central portion of the distal end surface of the second ferrite core 16. In addition, when the silicon rubber 15B, 15C has room in terms of a thickness, a structure may also be adopted such that a recessed portion is provided in the central portion of the silicon rubber 15B, 15C, and a projecting portion is provided either in the central portion of the proximal end surface of the first ferrite core 13B or in the central portion of the distal end surface of the second ferrite core 16.

[Modified Change 2]

Figure 7A:
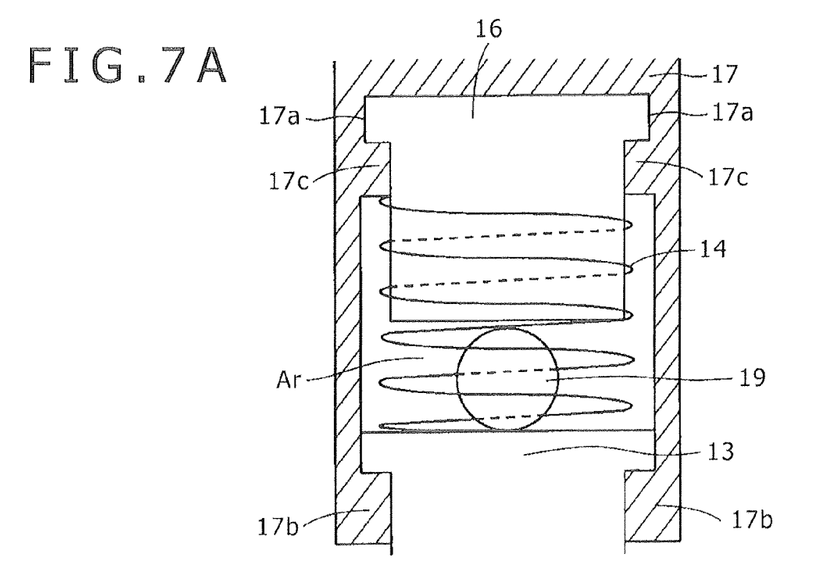
FIGS. 7A and 7B are views, each illustrating a pen type coordinate indicator according to Modified Change 2 of the embodiment of the present invention.
Figure 7B:
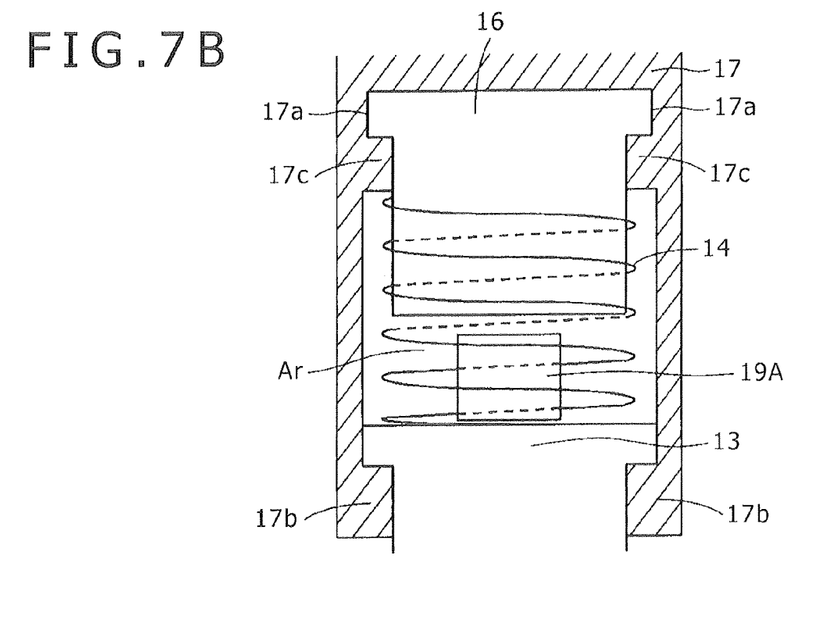

FIGS. 7A and 7B are views each illustrating a pen type coordinate indicator 1 according to Modified Change 2 of the embodiment. In the case of Modified Change 2 shown in FIGS. 7A and 7B, a shape of a silicon rubber 19, 19A as the second elastic body interposed between the first ferrite core 13 and the second ferrite core 16 is different from that of the silicon rubbers 15, 15A, 15B, and 15C previously described with reference to FIG. 1, FIGS. 3A and 3B, and FIGS. 6A and 6B. Other constituent portions are structured similarly to the case of the pen type coordinate indicator 1 previously described with reference to FIGS. 3 and 6.

In the case shown in FIG. 7A, a spherical silicon rubber 19 is used instead of using the sheet-like silicon rubbers 15, 15A, 15B, and 15C shown in FIGS. 3A and 3B, and FIGS. 6A and 6B. In addition, in the case shown in FIG. 7B, a columnar silicon rubber 19A is used instead of using the sheet-like silicon rubbers 15, 15A, 15B, and 15C shown in FIGS. 3A and 3B, and FIGS. 6A and 6B. Here, the columnar silicon rubber 19A may be either a cylindrical rubber or a prismatic (polygonal) rubber.

By adopting such a structure, the range in which the spherical silicon rubber 19 or the columnar silicon rubber 19A as the second elastic body operates as a second elastic body can be widened, whereby it becomes possible to precisely detect the pressing pressure (pen pressure) applied to the core body 11. In particular, as shown in FIG. 7A, the use of the spherical silicon rubber 19 results in that the phase can be desirably changed in accordance with the pressing pressure (load) applied to the core body 11.

In such a manner, in the case of Modified Change 2, the pen type coordinate indicator has the pressing pressure sensitivity corresponding to the first modulus of elasticity determined depending on the coil spring 14 until the distal end surface of the second ferrite core 16 comes to contact the silicon rubber 19, 19A. Thereafter, although the silicon rubber 19, 19A mainly operates in the section (distance) after the distal end surface of the second ferrite core 16 comes to contact the silicon rubber 19, 19A and as the pressing pressure is further applied to the core body 11, the pen type coordinate indicator 1 has the pressing pressure sensitivity corresponding to the second modulus of elasticity determined depending on either the coil spring 14 and the silicon rubber 19 or the coil spring 14 and the silicon rubber 19A.

The size of the spherical silicon rubber 19 or the columnar silicon rubber 19A as the second elastic body can be suitably set. Then, the interval of the section in which the proximal end surface of the first ferrite core 13 and the distal end surface of the second ferrite core 16 face each other can be readily set in accordance with the size of the spherical silicon rubber 19 or the columnar silicon rubber 19A. In addition, although not illustrated, a semi-spherical, conical or pyramid-like silicon rubber can also be used as the second elastic body. That is to say, any of members having various kinds of shapes can be used as the second elastic body, which is interposed between the first ferrite core 13 and the second ferrite core 16.

In addition, in the case of Modified Change 2 also, similarly to the case of Modified Change 1 previously described with reference to FIGS. 6A and 6B, a structure may be adopted such that a projecting portion is provided in the spherical silicon rubber 19 or the columnar silicon rubber 19A, and a recessed portion is provided in the central portion of the proximal end surface of the first ferrite core 13, thereby fixing the spherical silicon rubber 19 or the columnar silicon rubber 19A, and the first ferrite core 13 to each other. In addition, a structure may also be adopted such that a recessed portion is provided in the central portion of the distal end surface of the second ferrite core 16, and the spherical silicon rubber 19 or the columnar silicon rubber 19A is provided in the distal end surface of the second ferrite core 16. Of course, a structure may also be adopted such that a recessed portion is provided in the spherical silicon rubber 19 or the columnar silicon rubber 19A, and a projecting portion is provided either in the central portion of the proximal end surface of the first ferrite core 13 or in the central portion of the distal end surface of the second ferrite core 16.

[Modified Change 3]

Figure 8:
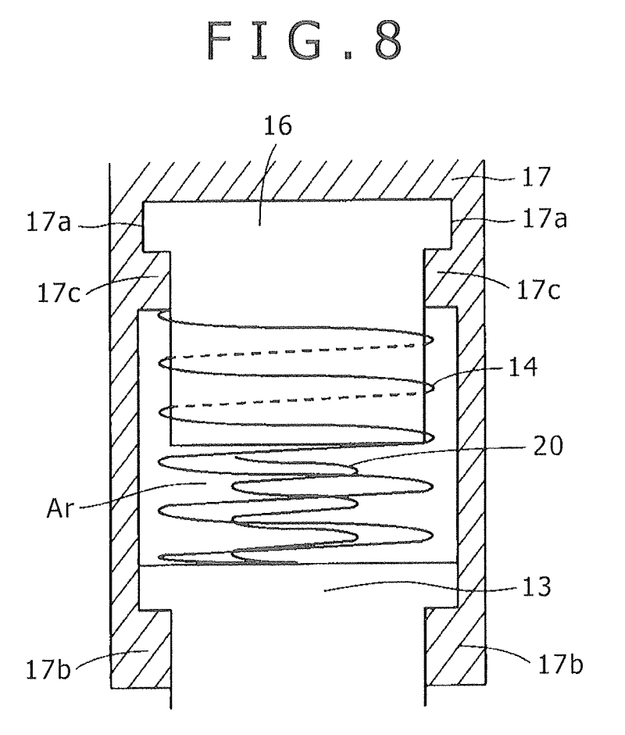
FIG. 8 is a view illustrating a pen type coordinate indicator according to Modified Change 3 of the embodiment of the present invention.

FIG. 8 is a view illustrating a pen type coordinate indicator 1 according to Modified Change 3 of the embodiment. In the case of Modified Change 3 shown in FIG. 8, a pen type coordinate indicator is different from each of the pen type coordinate indicators shown in FIGS. 1, 3A and 3B, FIGS. 6A and 6B, and FIGS. 7A and 7B, respectively, in that a coil spring 20 is used instead of using the silicon rubber 15, 15A, 15B, 15C as the second elastic body, which is interposed between the first ferrite core 13 and the second ferrite core 16. Other constituent portions are structured approximately in the same manner as that in each of the pen type coordinate indicators 1 previously described with reference to FIGS. 3A and 3B, FIGS. 6A and 6B, and FIGS. 7A and 7B, respectively.

In such a manner, the coil spring can also be used as the second elastic body and thus the degree of freedom in the design can be increased. For example, it is supposed that a coil spring whose modulus of elasticity is smaller than the modulus of elasticity, k2, of the silicon rubber is used as the second coil spring having a form shown in FIG. 8. In this case, in the range in which the second coil spring as the second elastic body operates, the degree to which the inductance value of the coil 12 changes corresponding to the pressing pressure can be made greater (steeper) than that in the case where the silicon rubber is used. Thus, the phase (frequency) of the electric wave transmitted from the resonance circuit of the pen type coordinate indicator 1 can be steeply changed.

In the case of Modified Change 3 also, similarly to the case of Modified Change 2 previously described with reference to FIGS. 7A and 7B, the pen type coordinate indicator 1 has the pressing pressure sensitivity corresponding to the first modulus of elasticity determined depending on the coil spring 14 until the end surface of the second ferrite core 16 comes to contact the second spring 20. Then, in the case of Modified Change 3 also, the pen type coordinate indicator 1 has the pressing pressure sensitivity corresponding to the second modulus of elasticity determined depending on both of the coil spring 14 and the second coil spring 20 in the section (distance) after the distal end surface of the second ferrite core 16 contacts the second coil spring 20 and as the pressing pressure is further applied to the core body 11. It is noted that in the case of Modified Change 3 also, the second coil spring 20 may be provided on the side of the second ferrite core 16 instead.

[Modified Change 4: Application to Pen Type Coordinate Indicator Using Variable Capacitor]

In the pen type coordinate indicator 1 of the embodiment described above, the phase (frequency) of the electric wave transmitted from the pen type coordinate indicator 1 is changed by changing the inductance value of the coil 12 wound around the first ferrite core 13. However, the present invention is by no means limited to this structure. For example, the present invention can also be applied to a pen type coordinate indicator in which the phase (frequency) of the electric wave transmitted is changed by changing a capacitance value of a variable capacitor (Modified Change 4).

Figure 9:
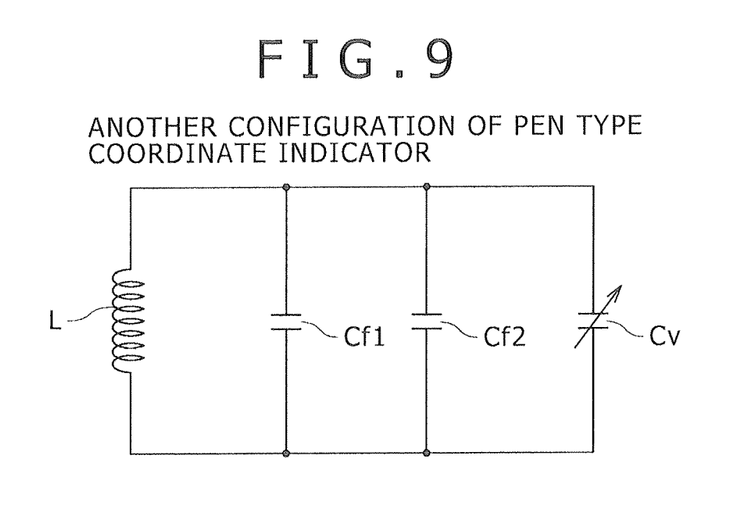
FIG. 9 illustrates an equivalent circuit of a pen type coordinate indicator using a variable capacitor (Modified Change 4)

FIG. 9 is a circuit diagram showing an equivalent circuit of the pen type coordinate indicator using the variable capacitor. The pen type coordinate indicator using the variable capacitor includes a resonance circuit composed of a coil L, one or more resonance capacitors Cf1 and Cf2, and a variable capacitor Cv. In a simpler construction, for example, the variable capacitor Cv in Modified Change 4 can be structured by providing electrodes on the end surfaces of the first ferrite core 13 and the second ferrite core 16 facing each other, respectively. The capacitance value of the capacitor composed of the two electrodes can be made variable in correspondence to a distance from the electrode provided on the proximal end surface of the first ferrite core 13 to the electrode provided on the distal end surface of the second ferrite core 16.

When such a variable capacitor is used in the pen type coordinate indicator also, the distance between the two electrodes facing each other can be adjusted based on the first elastic body composed of the coil spring, and the second elastic body composed of the silicon rubber. Therefore, the present invention can also be applied to the pen type coordinate indicator using the variable capacitor Cv as Modified Change 4 similarly to the case of each of the inductance controlled pen type coordinate indicators described above. It should be noted that the pen type coordinate indicator using the variable capacitor Cv is described, for example, in Patent Document 2 of Japanese Patent Laid-Open No. Hei 4-96212.

[Other Modified Changes]

In the embodiment of the present invention described above, the description has been given on the assumption that the modulus of elasticity, k1, of the first elastic body composed of the coil spring is smaller than the modulus of elasticity, k2, of the second elastic body composed of the silicon rubber. However, the present invention is by no means limited to this structure. For example, the modulus of elasticity, k1, of the first elastic body and the modulus of elasticity, k2, of the second elastic body may be equal to each other. In addition, when it is desired that the phase of the transmitted electric wave is gradually changed in the beginning of the pressing, and after a pressing pressure equal to more than a defined pressure value is applied to the core body, the phase of the transmitted electric wave is to be more rapidly changed, the modulus of elasticity, k1, of the first elastic body may be set larger than the modulus of elasticity, k2, of the second elastic body. The modulus of elasticity, k1, of the first elastic body and the modulus of elasticity, k2, of the second elastic body can be suitably set in such a manner.

In addition, although in the embodiment of the present invention described above, a portion is provided in which the coil spring 14 as the first elastic body is wound around the second ferrite core 16, the present invention is by no means limited to this structure. Alternatively, the entire coil spring 14 may be provided between the end surfaces of the first ferrite core 13 and the second ferrite core 16 facing each other.

In addition, plural coil springs, each of which is thinly formed, may be disposed in the circumference of the second ferrite core 16 above the proximal end surface of the first ferrite core 13. In this case, the plural coil springs disposed in the circumference of the second ferrite core 16 collectively form the first elastic body. In addition, as long as it is possible to realize the same function as that of the coil spring 14 in the embodiment described above, any of elastic members made of various kinds of materials and having various kinds of shapes can be used as the first elastic body.

In addition, plural small silicon rubbers, each having a circular or polygonal shape, or plural small coil springs can also be provided as the second elastic body on the proximal end surface of the first ferrite core 13 or the distal end surface of the second ferrite core 16. That is to say, as long as it is possible to realize the same function as that of the silicon rubber 15, 15A, 15B, 15C, 19, 19A or the second coil spring 20 in the embodiment described above, any of elastic members made of various kinds of materials and having various kinds of shapes can be used as the second elastic body.

What is claimed is:

1. A pen type coordinate indicator, comprising:
   a core body protruding from a distal end of a chassis to form a pen tip;
   a first magnetic body having a distal end surface contacting said core body, the first magnetic body being wound around by a coil;
   a second magnetic body disposed such that a distal end surface thereof faces an proximal end surface of said first magnetic body; and
   a first elastic body and a second elastic body interposed between said proximal end surface of said first magnetic body and said distal end surface of said second magnetic body,
   wherein a distance between said end surfaces of said first and second magnetic bodies facing each other is changed by a pressing pressure applied to the pen tip of said core body, and
   wherein, during a first time section of pressure application, at least said first elastic body is elastically deformed by a pressing pressure until said proximal end surface of said first magnetic body or said distal end surface of said second magnetic body comes in contact with said second elastic body, and during a second time section of pressure application after said contact with the second elastic body has been made, in addition to said first elastic body, said second elastic body is elastically deformed by a further pressing pressure, whereby said pen type coordinate indicator has a pressing pressure sensitivity corresponding to the distance between said end surfaces of said first and second magnetic bodies facing each other and the pressing pressure sensitivity of the first time section is different from the pressing pressure sensitivity of the second time section.

2. The pen type coordinate indicator according to claim 1, wherein the pressing pressure sensitivity of the first time section corresponds to a first modulus of elasticity that depends on at least said first elastic body, and the pressing pressure sensitivity of the second time section corresponds to a second modulus of elasticity that depends on both of said first elastic body and second elastic body.

3. The pen type coordinate indicator according to claim 2, wherein the first modulus of elasticity depends on both the first elastic body and the second elastic body, though a contribution of the first elastic body is dominant.

4. The pen type coordinate indicator according to claim 2, wherein the second modulus of elasticity depends on both the first elastic body and the second elastic body, though a contribution of the second elastic body is dominant.

5. The pen type coordinate indicator according to claim 1, wherein said first elastic body and said second elastic body serially contact each other, and are interposed between said end surfaces of said first magnetic body and said second magnetic body facing each other to be biased.

6. The pen type coordinate indicator according to claim 1, wherein said first elastic body is interposed between said end surfaces of said first magnetic body and said second magnetic body facing each other and is biased.

7. The pen type coordinate indicator according to claim 1, wherein said second elastic body is provided on at least one of said end surfaces of said first magnetic body and said second magnetic body facing each other.

8. The pen type coordinate indicator according to claim 7, wherein a projecting portion or a recessed portion is provided in said second elastic body, and a corresponding recessed portion or a projecting portion corresponding to said projecting portion or said recessed portion of said second elastic body, respectively, is provided in said at least one of said end surfaces of said first magnetic body and said second magnetic body facing each other on which said second elastic body is provided.

9. The pen type coordinate indicator according to claim 1, wherein said first elastic body is a spring member, and said second elastic body is a rubber member.

10. The pen type coordinate indicator according to claim 9, wherein said spring member forming said first elastic body is disposed in an outer circumference of said second magnetic body, and said second magnetic body is moved through said spring member by a pressing pressure to contact said second elastic body.

11. The pen type coordinate indicator according to claim 9, wherein said second elastic body is formed in a spherical shape, a semi-spherical shape, a conical shape, a pyramid shape, or a block shape having a polygonal cross-section.

12. The pen type coordinate indicator according to claim 1, wherein each of said first elastic body and said second elastic body is a spring member.

13. The pen type coordinate indicator according to claim 1, further comprising a variable capacitor configured to change its capacitance depending on a pressing pressure applied thereto to thereby function as a pressure sensing element.

14. The pen type coordinate indicator according to claim 1, wherein the pressing pressure sensitivity of the first time section and of the second time section is changed in accordance with deformations of said first elastic body and said second elastic body.

15. The pen type coordinate indicator according to claim 1, wherein the pressing pressure sensitivity of the first time section is greater than the pressing pressure sensitivity of the second time section.

16. The pen type coordinate indicator according to claim 1, wherein an amount of change in the distance between said end surfaces of said first and second magnetic bodies facing each other as caused by application of a defined amount of a pressing pressure is smaller in the second time section than in the first time section.

17. A method for detecting a pressing pressure applied to a pen tip of a pen type coordinate indicator for use with electronic input apparatus, the pen type coordinate indicator comprising: (i) a core body protruding from a distal end of a chassis to form the pen tip; (ii) a first magnetic body having a distal end surface contacting said core body; (iii) a second magnetic body disposed such that a distal end surface thereof faces an proximal end surface of said first magnetic body; and (iv) a first elastic body and a second elastic body interposed between said proximal end surface of said first magnetic body and said distal end surface of said second magnetic body, the method comprising:
  in response to application of a pressing pressure to the pen tip, deforming at least said first elastic member to narrow a distance between the proximal end surface of the first magnetic body and the distal end surface of the second magnetic body facing each other, during a first time section until said second elastic body comes in contact with another surface provided by the first and/or second magnetic bodies; and
  in response to a further application of a pressing pressure to the pen tip, deforming at least said second elastic member to further narrow said distance between the proximal end surface of the first magnetic body and the distal end surface of the second magnetic body facing each other, during a second time section after said second elastic body has come in contact with said another surface.

18. The method according to claim 17, wherein a pressing pressure sensitivity of the first time section corresponds to a first modulus of elasticity that depends on both the first elastic body and the second elastic body, though a contribution of the first elastic body is dominant.

19. The method according to claim 17, wherein a rate of change of said distance between the proximal end surface of the first magnetic body and the distal end surface of the second magnetic body facing each other as caused by application of a defined amount of a pressing pressure is greater in the first time section than in the second time section.

20. The method according to claim 17, wherein the second elastic body consists of one or more rubber members provided on said proximal end surface of the first magnetic body, and said another surface that comes in contact with the second elastic body is the distal end surface of the second magnetic body.

* * * * *